(12) United States Patent
Wang et al.

(10) Patent No.: US 8,284,869 B2
(45) Date of Patent: Oct. 9, 2012

(54) QAM DEMODULATION

(75) Inventors: Xinhua Wang, Mulgrave (AU); Nikolay Vaptzarov, Mulgrave (AU); Shikand Satheesh, Mulgrave (AU)

(73) Assignee: NEC Corporation, Tokyo (JP)

( * ) Notice: Subject to any disclaimer, the term of this patent is extended or adjusted under 35 U.S.C. 154(b) by 494 days.

(21) Appl. No.: 12/520,392

(22) PCT Filed: Dec. 12, 2007

(86) PCT No.: PCT/JP2007/074347
§ 371 (c)(1),
(2), (4) Date: Jun. 19, 2009

(87) PCT Pub. No.: WO2008/078613
PCT Pub. Date: Jul. 3, 2008

(65) Prior Publication Data
US 2010/0014612 A1    Jan. 21, 2010

(30) Foreign Application Priority Data

Dec. 22, 2006  (AU) .................................. 2006907293

(51) Int. Cl.
*H03D 1/24*   (2006.01)
(52) U.S. Cl. ........ 375/320; 375/262; 375/264; 375/341; 375/261; 375/265; 329/347; 329/348; 329/349; 329/353; 329/371; 329/304; 329/317

(58) Field of Classification Search .................. 375/262, 375/264, 341, 320, 261, 265; 329/304, 347, 329/348, 349, 353, 371, 317
See application file for complete search history.

(56) References Cited

U.S. PATENT DOCUMENTS

| | | | |
|---|---|---|---|
| 2004/0114692 A1* | 6/2004 | Matsumoto | 375/264 |
| 2004/0184399 A1* | 9/2004 | Chiou | 370/206 |
| 2006/0165128 A1* | 7/2006 | Peake et al. | 370/503 |

FOREIGN PATENT DOCUMENTS

| | | | |
|---|---|---|---|
| JP | 2001-45084 A | 2/2001 | |
| JP | 2002-26865 A | 1/2002 | |
| JP | 2003-46588 A | 2/2003 | |
| JP | 2004-112655 A | 4/2004 | |
| JP | 2004-112655 | * 8/2004 | ........................ 24/38 |

* cited by examiner

*Primary Examiner* — David Ometz
*Assistant Examiner* — Rahel Guarino
(74) *Attorney, Agent, or Firm* — Sughrue Mion, PLLC

(57) ABSTRACT

A method of demodulating a signal on which is modulated, using a quadrature amplitude modulation scheme, a plurality of information symbols, the method including: determining at least one QAM detection threshold corresponding to one or more of said information symbols; and demodulating each information symbol on the basis of at least one respective QAM detection threshold.

9 Claims, 3 Drawing Sheets

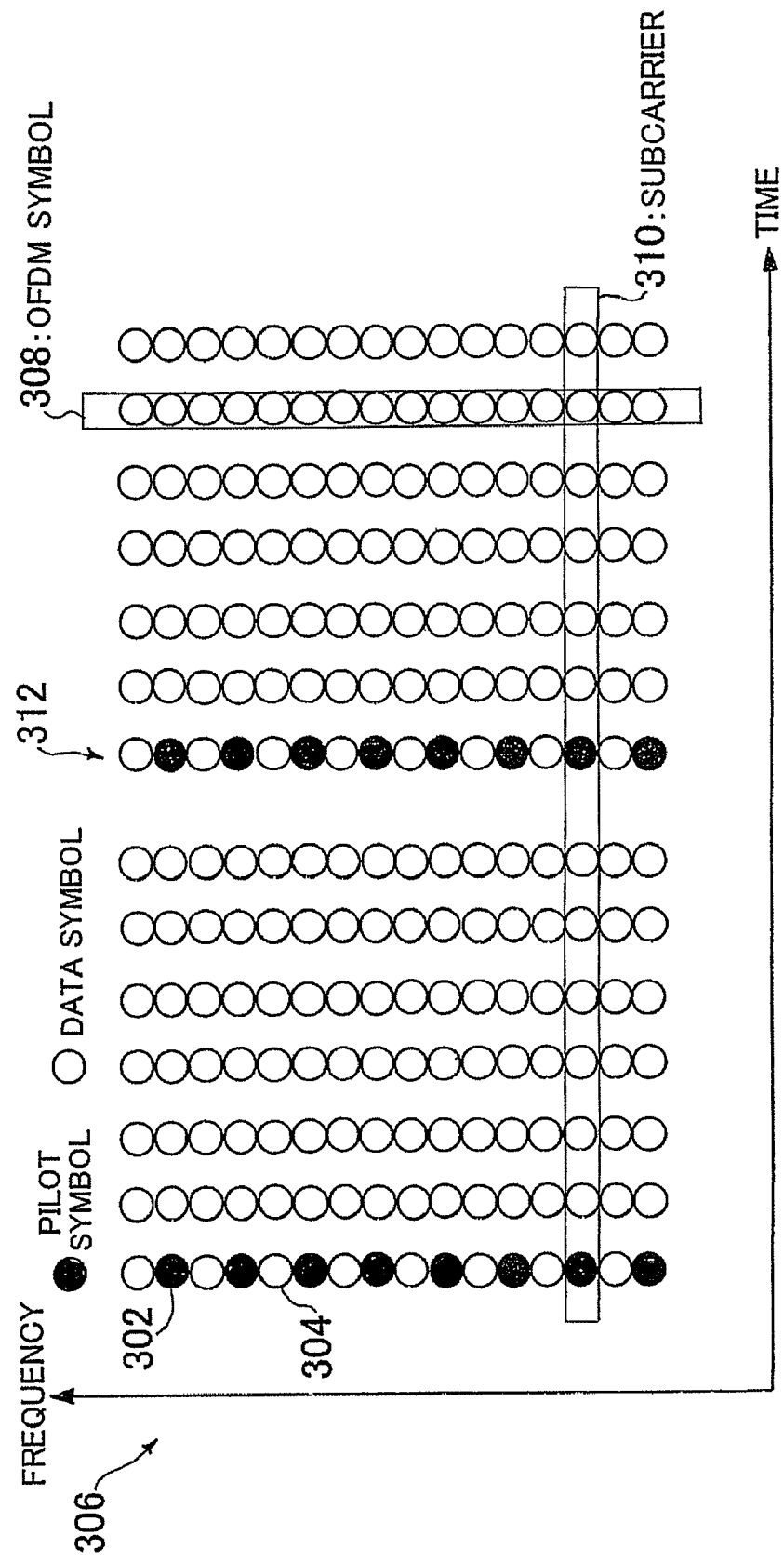

QAM DEMODULATION

TECHNICAL FIELD

The present invention relates to methods and systems for demodulating a quadrature amplitude modulated (QAM) signal. It will be convenient to describe an illustrative embodiment of the invention in relation to the demodulation of an orthogonal frequency division multiplexed (OFDM) signal, however the present invention should not be considered as being limited to this exemplary implementation.

BACKGROUND ART

In a receiver of a communications system the received signal must be demodulated to extract the transmitted data bits from the received radio signal.

In a system using quadrature amplitude modulation (QAM) the receiver will typically process the received signal in a block-wise fashion using a common QAM detection threshold for a block of equalised data symbols.

The present inventors have ascertained that in certain circumstances this scheme yields sub-optimal performance. For example, if the equalised data symbols carry the signal strength information which can be used to improve channel decoding performance, use of a common QAM threshold will not yield good performance due to the amplitude fluctuation of equalised data symbols.

SUMMARY OF INVENTION

Technical Problem

On the other hand, if the equalised data symbols do not carry the signal strength information a common threshold can be used. However in this case the demodulated soft bits will not carry the signal strength information, either meaning that all soft bits will contribute equally to the channel decoding decision, regardless of whether they are reliable or not. The end result is that the system performance at the channel decoding stage may again be sub-optimal.

It should be noted that the discussion of prior art herein is not an admission that prior art forms part of the common general knowledge in the art at the priority date of the present application.

Solution to Problem

In a first aspect the present invention provides a method of demodulating a signal on which is modulated, using a quadrature amplitude modulation scheme, a plurality of information symbols. The method includes determining at least one QAM detection threshold corresponding to one or more of said information symbols; and demodulating each information symbol on the basis of at least one respective QAM detection threshold.

The information symbols modulated on the signal can have a plurality data symbols arranged between a pair of successive pilot symbols, in which case it is preferable that at least one common QAM detection threshold is determined for a less than the number of symbols between said successive pilot symbols.

In a preferred form at least one QAM detection threshold is determined in respect of an individual information symbol.

In an embodiment the QAM detection thresholds can be determined by:

(a) determining an amplitude value in respect of a plurality of pilot symbols; and
(b) determining an amplitude value in respect of one or more information symbols between at least two of said pilot symbols on the basis of the amplitude values determined in step (a).

In this case the amplitude value in respect of the information symbols between the pilot symbols can be determined by extrapolating or interpolating between the values determined in step (a).

In one form, the signal is an orthogonal frequency division multiplexing symbol.

In a second aspect, the present invention provides an apparatus for demodulating a signal including a plurality of information symbols which are modulated using a quadrature amplitude modulation scheme, the apparatus including: means for determining at least one QAM detection threshold corresponding to one or more of said information symbols; and means for demodulating each information symbol on the basis of at least one respective QAM detection threshold.

The apparatus can further include channel estimation means configured to estimate a channel response of the signal; and means for equalising the signal on the basis of the channel response determined by the channel estimation means.

The means for determining at least one QAM detection threshold can be configured to implement a method according to an embodiment of first aspect of the present invention.

In a further aspect, the present invention provides a receiver adapted to receive a signal which is modulated using a quadrature amplitude modulation scheme. The receiver includes an apparatus according to an embodiment of the second aspect of the present invention.

BRIEF DESCRIPTION OF DRAWINGS

FIG. 3 Illustration of an exemplary data structure of an OFDM system.

DESCRIPTION OF EMBODIMENTS

In broad concept the QAM Demodulator of the preferred embodiment uses a QAM demodulation threshold that depends on the data symbol strength to produce soft bits and signal strength information in respect of each symbol. Most preferably, in the preferred forms of the present invention, each data symbol to be demodulated has its own QAM detection threshold derived either from the equalised pilot symbols or from the channel estimates. Advantageously a channel decoder, such as Turbo decoder, can take advantage of the signal strength information and improve the system performance.

Figure 1:
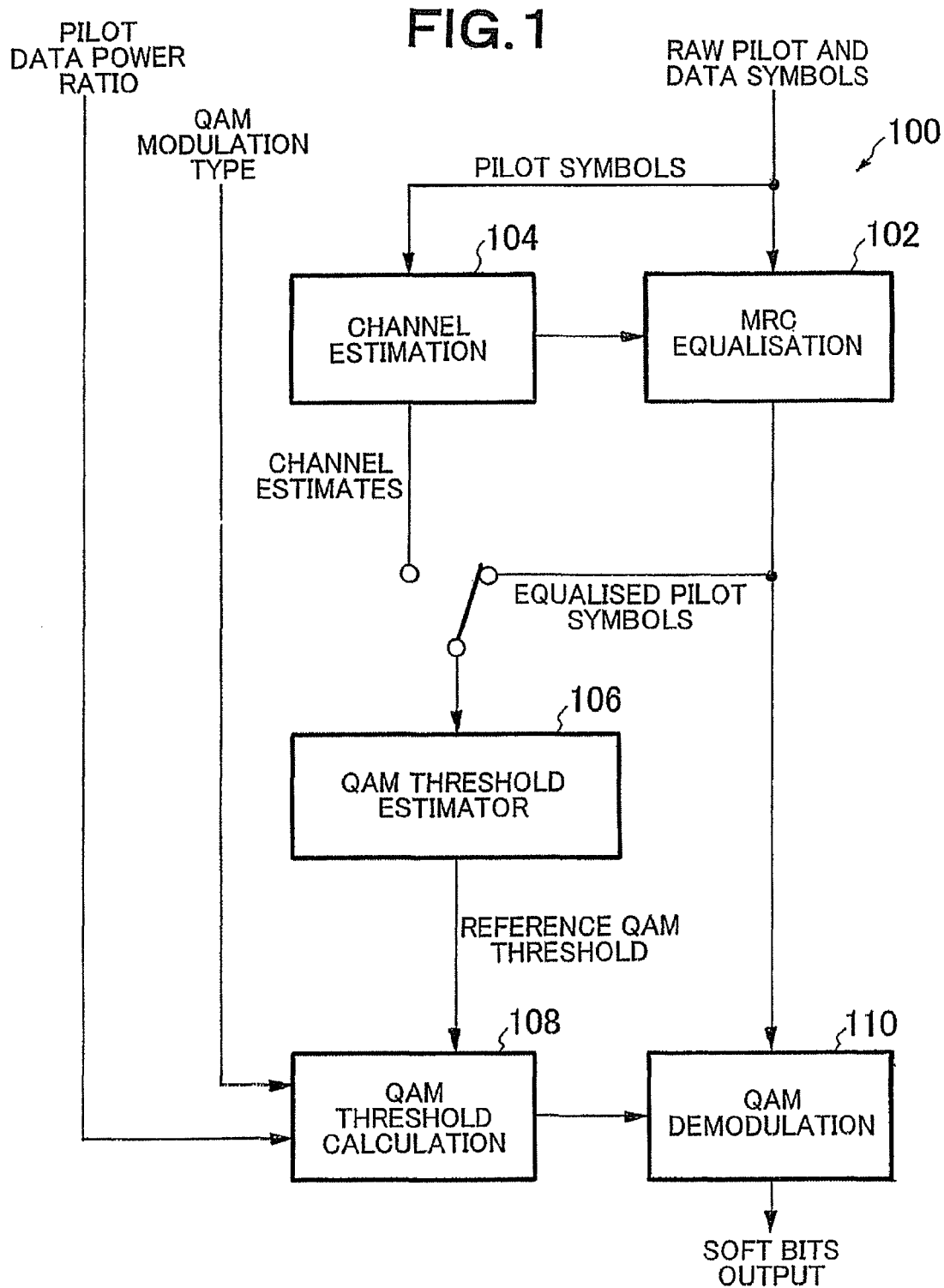
FIG. 1 A block diagram of a QAM Demodulator operating in accordance with an embodiment of the present invention.

FIG. 1 shows a block diagram of a QAM Demodulator forming part of a receiver, which is made in accordance with a first embodiment, which uses a floating QAM detection threshold.

The QAM Demodulator 100 includes five main processing blocks, namely an MRC Equalisation Block 102, a Channel Estimator Block 104, a QAM Threshold Estimator Block 106, a QAM Threshold Calculation Block 108 and a QAM Demodulation Block 110. The QAM Demodulator 100 receives, as its input raw pilot and data symbols and data representing a QAM demodulation type and pilot to data power ratio. The data output from the Demodulator 100 are demodulated soft-bits for further processing.

The function of each of the main functional blocks 102 to 110 will now be described. As will be appreciated functionality may be divided differently between functional processing blocks in situ embodiments, without departing from the present invention.

Channel Estimation Block 104: The Channel Estimation Block 104 is used to estimate the channel response at each data symbol position using the relevant pilot symbols. The channel estimates are used to correct phase distortion in data symbols caused by channel impairments. Because the data carried by pilot symbols are known to the receiver, they can be used to estimate the channel responses. Any known channel estimation scheme can be used for this function.

MRC Equalisation Block 102: The MRC Equalisation Block 102 receives raw data symbols and equalises them by multiplying them by the complex conjugate of the channel estimates generated by the Channel Estimation Block 104. This operation corrects phase distortion in the data symbols. The amplitude distortion in data symbols are not corrected so that the signal strength information of the received data symbols is retained and can be used in later channel decoding.

QAM Threshold Estimator 106: The Threshold Estimator 106 estimates the signal strengths and produces a reference QAM detection threshold for each equalised data symbol or subset of the data symbols using the equalised pilot symbols or channel estimates. Detailed algorithms used for the estimation depend on application. An exemplary algorithm applicable to an OFDM system will be described below. Because the amplitude distortion is not corrected in the MRC Equalisation Block 102, the amplitudes of equalised data symbols will fluctuate significantly under fading conditions. Consequently, a common QAM detection threshold for a block of equalised data symbols will not perform well.

QAM Threshold Calculation Block 108: One or more QAM demodulation thresholds may be required to demodulate a data symbol, depending on the QAM modulation type used, eg. 16-QAM or 64-QAM. The QAM Threshold Calculation Block 108 derives these thresholds for each data symbol using the reference QAM threshold determined by the QAM Threshold Estimator 106. The thresholds are determined on the basis of the QAM modulation type and the pilot-to-data power ratio which are provided as inputs to the demodulator 100.

QAM Demodulation Block 110: In the QAM Demodulation Block 110 each equalised data symbol is demodulated using the QAM detection thresholds for the data symbol by the QAM Threshold Calculation Block 108. As noted above, the number of thresholds required to demodulate each data symbol depends on the QAM modulation type such as 16-QAM or 64-QAM. The QAM Demodulation Block 110 outputs demodulated soft-bits for further processing in the receiver.

Because the method for QAM threshold estimation used will generally be system-dependent, an exemplary QAM Threshold Estimator for an OFDM system will be described in connection with FIG. 2. In this case the equalised pilot symbols will be used to derive the QAM reference thresholds.

Figure 2:
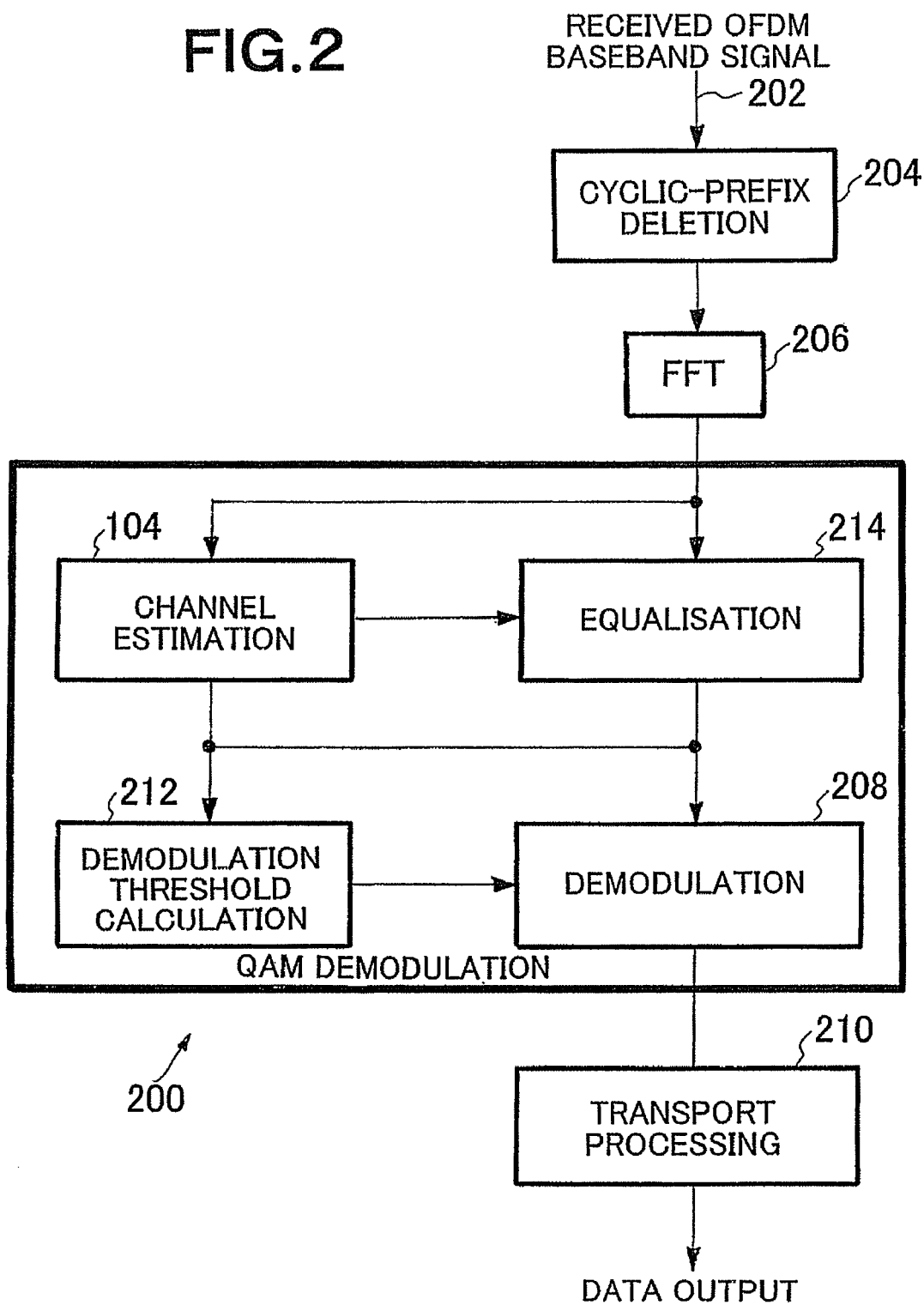
FIG. 2 A block diagram of a portion of a simplified OFDM receiver subsystem including a QAM Demodulator operating in accordance with an embodiment of the present invention.

FIG. 2 shows a simplified OFDM receiver subsystem, including a QAM Demodulator according to an embodiment of the present invention. The Receiver 200 is configured to receive an OFDM base band symbol as an input 202. The Cyclic Prefix Deletion Block 204 removes the Cyclic Prefix added between OFDM symbols by the transmitter. The signal is then converted to a frequency domain signal by Fast Fourier Transform (FFT) Block 206 and the demodulated signal is output for further processing by a Transport Processing Block 210 and subsequent stages (not shown).

In this example, the QAM Demodulator 208 includes a single processing block, termed the Demodulation Threshold Calculation Block 212 that performs the combined functionality of the QAM Threshold Estimator 106 and QAM Threshold Calculation Block 108 of FIG. 1.

In order to better understand the QAM Threshold Estimator for such an OFDM system, it is useful to describe the data structure of an OFDM base band signal after the FFT operation in FIG. 2.

FIG. 3 shows an example of the data structure 300 for an OFDM system, where each pilot eg. 302 or data symbol eg. 304 is positioned in a T-F (Time-Frequency) grid 306. It should be noted that FIG. 3 is simply an example to be used for convenience and embodiments of the present invention can be applied to any OFDM system using any pilot and data structures.

Generally speaking, the data structure 300 shown in FIG. 3 is applicable to an OFDM signal both before and after Equalisation. Before Equalisation, pilot and data symbols are termed "raw" pilot and data symbols. After Equalisation, pilot and data symbols are called "equalised" pilot and data symbols. In the diagram the columns eg. 308 represent OFDM symbols transmitted across a plurality of frequency sub-carriers, and rows of data symbols eg. 310, represent data symbols transmitted in successive time intervals on the same sub-carrier.

In the example of FIG. 2, equalised pilot symbols generated by Equalisation Block 214 are used to calculate the reference QAM threshold in Block 212 in a similar manner to that as shown in FIG. 1. Because pilot symbols generally occupy only a small portion of Time-Frequency grid in an OFDM data structure, it may be practical to use a sophisticated algorithm to estimate the signal strength at pilot symbol positions first, and then interpolate and/or extrapolate to determine the signal strength at data symbol positions on the basis of the signal strength of pilot symbol positions. The signal strength at data symbol positions will be used as reference QAM threshold.

To better illustrate the present invention, an example applied to an OFDM system that uses pilot and data structure shown in FIG. 3 will now be presented.

In such an example the QAM Threshold Estimator (106 of FIG. 1 or 212 of FIG. 2) operates as follows:
1. A Finite Impulse Response (FIR) filter is used to smooth the equalised pilot symbols with appropriate boundary handling;
2. Next, the smoothed pilot symbols from Step 1 are converted from complex number values into real amplitudes;
3. Interpolate and/or extrapolate between smoothed pilot symbol positions in each OFDM symbol that contains pilot symbols, (eg. OFDM symbol 312 of FIG. 3) using the amplitudes of smoothed pilot symbols from Step 2 to determine amplitude at each non-pilot symbol position in the OFDM symbol.
4. Calculate the QAM reference threshold for each data symbol in the OFDM symbols that do not contain pilot symbols by Interpolating and or extrapolating the amplitudes of the smoothed pilot and non-pilot symbols from Step 3.

Following this method, each equalised data symbol in the T-F grid will have a corresponding QAM reference threshold which can be used to calculate one or more corresponding QAM demodulation thresholds for the data symbol.

It should be noted that the partition of the functional blocks illustrated above is for illustration purposes only, and the functional split between blocks may vary in other implementations. For example, the pilot-to-data power ratio adjustment can be performed either in the "QAM Threshold Estimator" or in the "QAM Threshold Calculation". However, the present inventors believe that it is computationally more efficient to make this adjustment in the "QAM Threshold Calculation" block.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

The invention claimed is:

1. A method of demodulating a signal on which is modulated, using a quadrature amplitude modulation scheme, a plurality of information symbols, the method including:
    determining at least one QAM detection threshold corresponding to one or more of said information symbols; and
    demodulating each information symbol on the basis of at least one respective QAM detection threshold,
    wherein the information symbols modulated on the signal have a plurality data symbols arranged between a pair of successive pilot symbols, and
    wherein at least one common QAM detection threshold is determined for a less than the number of symbols between said successive pilot symbols.

2. The method of claim 1, wherein at least one common QAM detection threshold is determined in respect of individual information symbols.

3. The method of claim 1 wherein the QAM detection thresholds are determined by:
    (a) determining an amplitude value in respect of a plurality of pilot symbols; and
    (b) determining an amplitude value in respect of one or more information symbols between at least two of said pilot symbols on the basis of the amplitude values determined in step (a).

4. The method of claim 3, wherein the amplitude value in respect of the information symbols between the pilot symbols by extrapolating or interpolating between the values determined in step (a).

5. The method of claim 1, wherein the signal is an orthogonal frequency division multiplexing symbol.

6. An apparatus for demodulating a signal including a plurality of information symbols which are modulated using a quadrature amplitude modulation scheme, the apparatus including:
    means for determining at least one QAM detection threshold corresponding to one or more of said information symbols; and
    means for demodulating each information symbol on the basis of at least one respective QAM detection threshold,
    wherein the information symbols modulated on the signal have a plurality data symbols arranged between a pair of successive pilot symbols, and
    wherein at least one common QAM detection threshold is determined for a less than the number of symbols between said successive pilot symbols.

7. The apparatus of claim 6 which further includes channel estimation means configured to estimate a channel response of the signal; and means for equalizing the signal on the basis of the channel response determined by the channel estimation means.

8. A receiver adapted to receive a signal on which is modulated a plurality of information symbols using a quadrature amplitude modulation scheme, the receiver including an apparatus as claimed in claim 6 for demodulating the signal.

9. A receiver adapted to receive a signal on which is modulated a plurality of information symbols using a quadrature amplitude modulation scheme, the receiver including an apparatus as claimed in claim 7 for demodulating the signal.

* * * * *